United States Patent
Florkey et al.

(10) Patent No.: US 7,171,228 B2
(45) Date of Patent: Jan. 30, 2007

(54) APPLICATION SERVER COMPONENT NOTIFICATION TO ONE OR MORE COMMUNICATION DEVICES OF ONE OR MORE OPEN COMMUNICATION SESSIONS

(75) Inventors: Cynthia Kae Florkey, Chicago, IL (US); Victoria Marie Halsell, Aurora, IL (US); Karla Rae Hunter, Naperville, IL (US); Mrinal Milind Joglekar, Woodridge, IL (US); Randall Joe Wilson, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 744 days.

(21) Appl. No.: 10/600,109

(22) Filed: Jun. 20, 2003

(65) Prior Publication Data

US 2004/0259580 A1 Dec. 23, 2004

(51) Int. Cl.
*H04Q 7/20* (2006.01)
*H04Q 7/22* (2006.01)
*H04Q 7/00* (2006.01)
(52) U.S. Cl. .................. 455/519; 455/414.2; 455/521
(58) Field of Classification Search ............... 455/416, 455/414.3, 517, 519, 466, 518, 414.2, 412.2; 370/270, 260; 379/202.01; 709/219, 223
See application file for complete search history.

(56) References Cited

U.S. PATENT DOCUMENTS

| 5,916,302 | A  | * | 6/1999  | Dunn et al. .................. 709/204 |
| 6,499,053 | B1 | * | 12/2002 | Marquette et al. .......... 709/204 |
| 6,788,949 | B1 | * | 9/2004  | Bansal ........................ 455/519 |
| 6,792,265 | B1 | * | 9/2004  | Chan et al. .................. 455/416 |
| 6,870,916 | B2 | * | 3/2005  | Henrikson et al. ...... 379/202.01 |
| 6,915,138 | B2 | * | 7/2005  | Kraft ........................... 455/466 |
| 2002/0055973 | A1 | * | 5/2002 | Low et al. ................... 709/204 |
| 2002/0076025 | A1 | * | 6/2002 | Liversidge et al. .... 379/202.01 |
| 2003/0053612 | A1 | * | 3/2003 | Henrikson et al. ...... 379/202.01 |
| 2004/0037406 | A1 | * | 2/2004 | Gourraud ............... 379/202.01 |

* cited by examiner

*Primary Examiner*—Tilahun Gesesse

(57) ABSTRACT

An application server component of an apparatus in one example receives one or more notifications of one or more open communication sessions from one or more first communication devices. The application server component sends one or more of the one or more notifications of one or more of the one or more open communication sessions to one or more second communication devices. Upon a request by a communication device of the one or more second communication devices to join an open communication session of the one or more of the one or more open communication sessions, the application server component initiates a connection of the communication device to the open communication session.

20 Claims, 3 Drawing Sheets

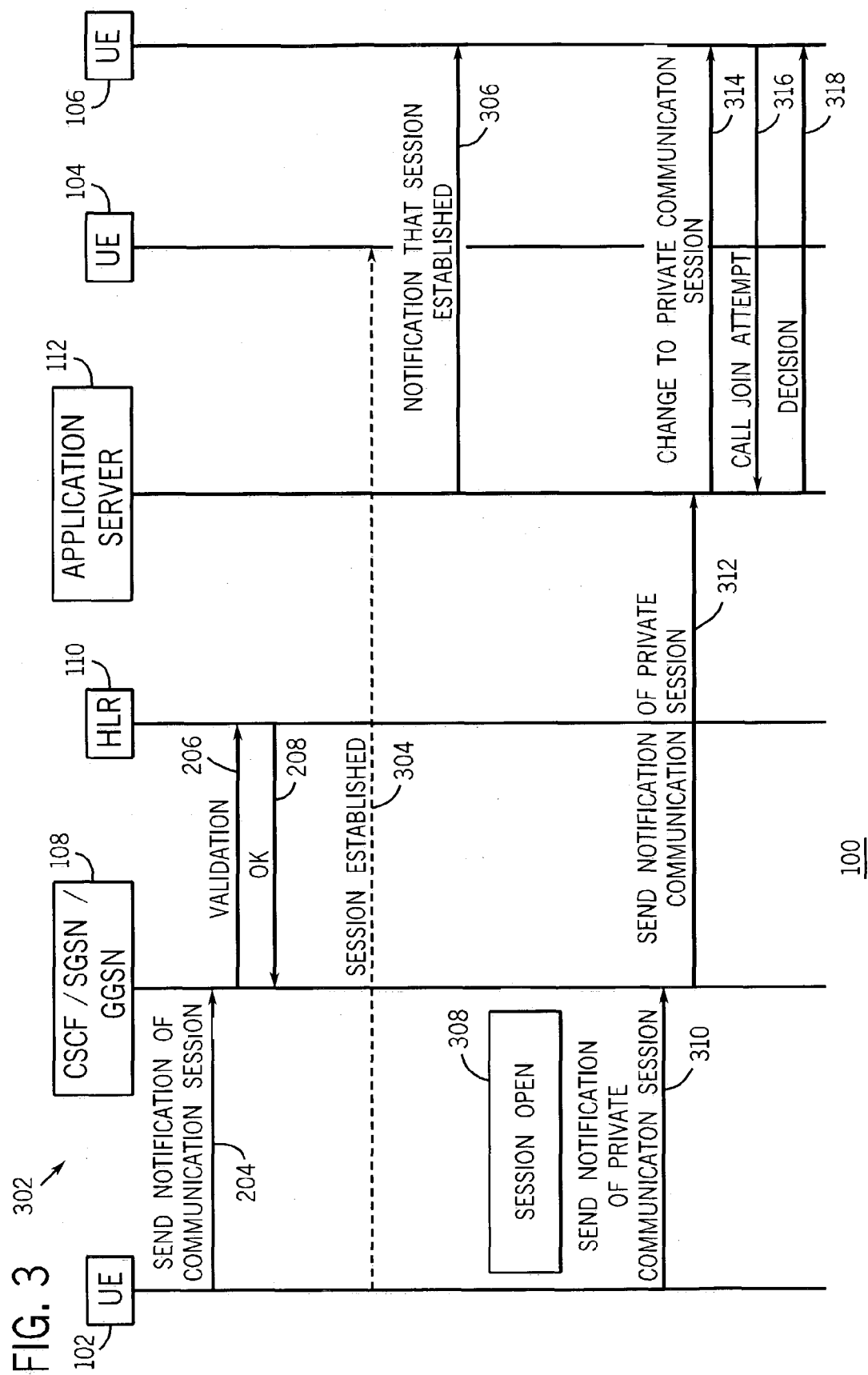

APPLICATION SERVER COMPONENT NOTIFICATION TO ONE OR MORE COMMUNICATION DEVICES OF ONE OR MORE OPEN COMMUNICATION SESSIONS

CROSS-REFERENCE TO RELATED APPLICATION

This application contains subject matter which is related to the subject matter of the following application, which is assigned to the same assignee as this application. The below-listed application is hereby incorporated herein by reference in its entirety:

"APPLICATION SERVER COMPONENT THAT NOTIFIES ONE OR MORE COMMUNICATION DEVICES OF ONE OR MORE INVITATIONS TO JOIN COMMUNICATION SESSION," by Florkey, et al., co-filed herewith.

TECHNICAL FIELD

The invention relates generally to communications and more particularly to open communication sessions.

BACKGROUND

Users of communication devices in one example desire to have the ability to conduct communication sessions. The communication devices in one example comprise mobile phones, telephonic devices, personal digital assistants and computers. The communication session in one example comprises one or more of a chat room session, a netmeeting, a voice conference call, or an instant message session.

Where the communication session comprises a voice conference call, the voice conference call is set up in advance. As one shortcoming, a user of a first communication device must reserve a conference bridge and/or one or more ports for one or more users of the voice conference call. The user of the first communication device employs the first communication device to send a notification that comprises an email, a short message service ("SMS") message, or a voice message to alert a user of a second communication device of the voice conference call. As one shortcoming, the user of the first communication device must reserve a conference bridge and/or one or more ports for the users of the voice conference call. As another shortcoming, the user of the second communication device is unaware of the notification to join the voice conference call until the user of the second communication device checks the email, the short message service message, or the voice message. As yet another shortcoming, it may take the user of the second communication device a long time to check the voice message and dial the phone number of the first communication device. As still another shortcoming, the user of the second communication device does not know one or more of the users involved in the voice conference call. For example, the user of the second communication device may not want to talk to the users in the voice conference call.

Where the communication session comprises the voice conference call, the netmeeting, and/or the instant message session, as one shortcoming, the communication session does not support an ability to display information that comprises a topic and/or names of users of the communication session. For example, an inability to display the information makes the communication session less secure.

Thus, a need exists for increased availability of information from a communication session to a communication device. Another need exists to enhance an ability of a communication device to join a communication session after receipt of a notification to join the communication session.

SUMMARY

The invention in one embodiment encompasses an apparatus. The apparatus comprises an application server component that receives one or more notifications of one or more open communication sessions from one or more first communication devices. The application server component sends one or more of the one or more notifications of one or more of the one or more open communication sessions to one or more second communication device. Upon a request by a communication device of the one or more second communication devices to join an open communication session of the one or more of the one or more open communication sessions, the application server component initiates a connection of the communication device to the open communication session.

Another embodiment of the invention encompasses a method. One or more notifications of one or more open communication sessions are sent to one or more communication devices from the application server component. A request to join an open communication session of the one or more open communication sessions is received at the application server component from a communication device of the one or more communication devices. A connection of the communication device to the open communication session is initiated by the application server component.

Yet another embodiment of the invention encompasses an article. The article comprises one or more computer-readable signal-bearing media. The article comprises means in the one or more media for sending one or more notifications of one or more open communication sessions to one or more communication devices. The article comprises means in the one or more media for receiving a request to join an open communication session of the one or more open communication sessions from a communication device of the one or more communication devices. The article comprises means in the one or more media for initiating a connection of the communication device to the open communication session.

DESCRIPTION OF THE DRAWINGS

Features of exemplary implementations of the invention will become apparent from the description, the claims, and the accompanying drawings in which:

FIG. 3 is a representation of an exemplary implementation of a message flow illustrating an employment of notifications, requests, acceptances, and rejections of an open communication session by the application server component of FIG. 1.

DETAILED DESCRIPTION

Figure 1:
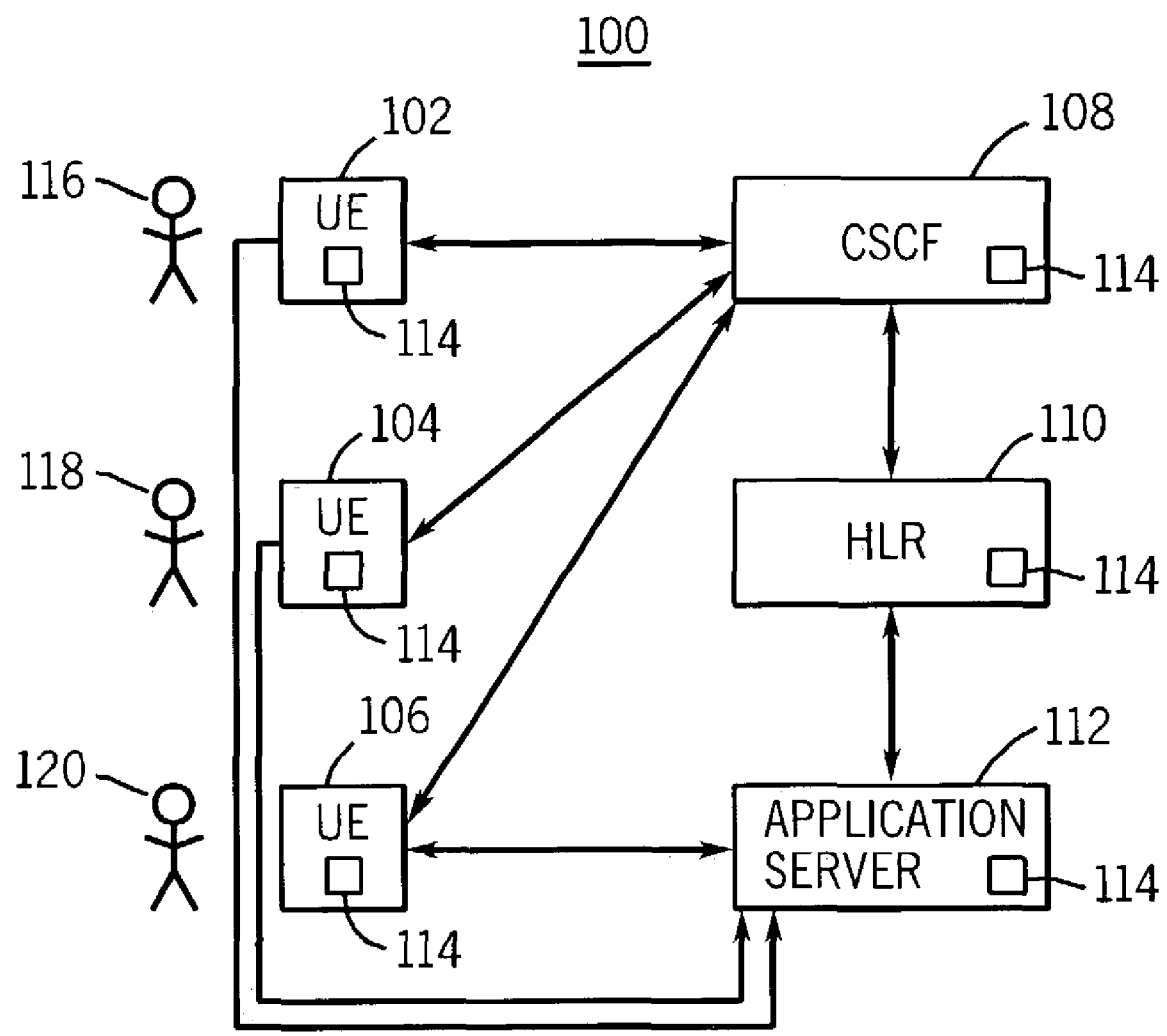
FIG. 1 is a representation of an exemplary implementation of an apparatus that comprises one or more communication devices, one or more control components, one or more register components, and one or more application server components.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example comprises one or more communication devices 102, 104, and 106, one or more control components 108, one or more register components 110, and one or more application server components 112. The apparatus 100 in one example comprises a telecommunications and/or computer network. One or more users 116, 118, and 120 employ the one or more communication devices 102, 104, and 106 for communication. For example, the user 116 employs the communication device 102 to initiate an open communication session with one or more of the users 118 and 120 of the communication devices 104 and 106.

A type of open communication session in one example comprises a data session or a voice chat room. The users 116, 118, and 120 employ one or more of the communication devices 102, 104, and 106 to communicate in the open communication session. The communication devices 102, 104, and 106 in one example comprise one or more of a telephonic device, a mobile phone, a personal digital assistant, and a computer. For example, one or more of the communication devices 102, 104, and 106 comprise user equipment ("UE"). The communication devices 102, 104, and 106 in one example comprise an instance of the recordable data storage medium 114.

The user 116 of the communication device 102 in one example desires to include the users 118 and 120 of the communication devices 104 and 106 in an open communication session. The user 102 employs the communication device 102 to send one or more notifications of the open communication session as a message to the application server component 112. The message in one example comprise one or more of a phone call, a photo, an email, an instant message, a short message service ("SMS") message, and an unstructured supplementary services data message ("USSD"). The notifications comprise information of the open communication session that may vary based on the message. For example, the information comprises one or more of a list of the users 116, 118, 120, a topic, a time, a limit to a number of communication devices, a type of the open communication session, and a session identification of the open communication session. The application server component 112 in one example stores the one or more of the list of the users 116, 118, 120, the topic, the time, the limit to the number of the communication devices, the type of the open communication session, and the session identification of the open communication session.

The application server component 112 sends the notifications of the open communication session to the communication devices 104 and 106. The notifications in one example activate one or more indicators of the open communication session on the communication devices 104 and 106. For example, the indicators comprise one or more of an icon, a tone, and a light. The indicators in one example serve to represent an open communication session for the communication devices 104 and 106 to join.

The users 118 and 120 in one example employ the communication devices 104 and 106 to receive one or more of the notifications from the application server component 112. The users 118 and 120 employ the communication devices 104 and 106 to obtain information of the one or more notifications. For example, the communication devices 104 and 106 output one or more topics, one or more lists, and one or more times of the one or more notifications to the users 118 and 120. The users 118 and 120 employ the topics, the lists, and the times to make a determination to send a request to join one or more of the open communication sessions.

The communication device 104 in one example sends the request to the application server component 112 to join the open communication session. In one example, the request comprises the topic that corresponds to the open communication session. The user 118 employs the communication device 104 to make a selection of the topic of the open communication session. For example, the user 118 employs the communication device 104 to push a button, select a menu item, enter a voice command, or enter an SMS message to join the open communication session. In another example, the user 118 employs the list of users on the open communication session to make a determination to join the open communication session. For example, the user 118 may not wish to talk to a user on the list of users. In yet another example, the request comprises one or more of a phone call, an email, an instant message, a short message service message, and an unstructured supplementary services data message.

In one example, the application server component 112 rejects the request to join the open communication session. For example, where the information comprises the limit to the number of communication devices able to participate in the open communication session, once the number of the communication devices reaches the limit, the application server component 112 rejects subsequent requests of the communication devices to join the communication session. For example, the application server component 112 rejects the subsequent request to avoid communication network overload.

In another example, the request comprises a session identification of the open communication session. The session identification in one example comprises one or more of a telephone number and an IP address of the open communication session. The application server component 112 sends the session identification of the open communication session to the control component 108. The control component 108 connects the communication device 104 to the open communication session. The user 116 can now talk with the user 118 in the open communication session.

In yet another example, prior to receipt of the request, the user 116 employs the communication device 102 to send a notification of a private communication session. For example, the user 116 may not want to speak with one or more of the users 118 and 120 of the communication devices 104 and 106. The notification of the private communication session in one example comprises a withdrawal of the one or more indicators of the open communication session. The open communication session-in one example becomes the private communication session.

The communication device 104 may send a request to the application server component 112 to join the private communication session. In one example, the application server component 112 sends a rejection of the request to the communication device 104. In another example, the application server component 112 sends an acceptance of the request to the communication device 104. One or more of the notification of the private communication session, the request, the acceptance, and the rejection comprise one or more of an email, an instant message, a short message service message, and an unstructured supplementary services data message.

The users 116, 118, and 120 employ the communication devices 102, 104, and 106 to send one or more of the notifications and the requests. In one example, the users 116, 118, and 120 employ a hard button to send the one or more of the notifications and the requests. The hard button in one example comprises one or more of an alpha-numeric keypad and a keyboard. In another example, the users 116, 118, and 120 employ a soft button to send the one or more of the notifications and the requests. The soft button in one example comprises one or more of an icon, a touch-screen, a selectable menu item, and an indicator. In yet another example, the users 116, 118, and 120 employ a voice command to send one or more of the notifications and the requests.

The control component 108 in one example transfers one or more of the notifications, the requests, the acceptances, and the rejections between one or more of the communication devices 102, 104, and 106 and the application server component 112. Where one or more of the notifications and the requests comprise a session identification, the application server component 112 sends the session identification to the control component 108. The control component 108 in one example connects one or more of the communication devices 102, 104, and 106 to an open communication session. For example, the control component 108 employs the session identification of the open communication session to connect the one or more of the communication devices 102, 104, and 106 to the open communication session.

The control component 108 in one example comprises a call state control function ("CSCF"). In one example, where one or more of the communication devices 102, 104, and 106 comprise one or more of a personal digital assistant and a computer, the control component 108 comprises one or more of a gateway general packet radio service support node ("GGSN") and a serving general packet radio service support node ("SGSN"). In another example, where one or more of the communication devices 102, 104, and 106 comprise a mobile phone and a telephonic device the control component 108 comprises one or more switch functions.

The one or more register components 110 interface with the control component 108. The register component 110 in one example determines that an open communication session service is available for the communication devices 102, 104, and 106. For example, the register component 110 makes a validation that the users 116, 118, and 120 subscribe to the open communication session service for the control component 108. The register component 110 in one example comprises a home location register ("HLR"). The register component 110 in one example comprises an instance of the data recordable storage medium 114.

Once the register component 110 makes the validation, the application server component 112 in one example transfers one or more of the notifications, the requests, the acceptances, and the rejections between one or more of the communication devices 102, 104, and 106 and the control component 108. For example, the user 116 employs the communication device 102 to send a notification to the application server component 112. The application server component 112 broadcasts the notification to the communication devices 104 and 106. The user 118 employs the communication device 104 to send a request to join the open communication session to the application server component 112.

The application server component 112 in one example initiates a connection of the communication device 104 to the communication session. For example, the application server component 112 employs a session identification of one or more of the request and the notification to indicate to the control component 108 the session identification of the open communication session. The control component 108 employs the session identification to connect the communication device 104 to the open communication session. In one example, the control component 108 and the application server component 112 are separate components. In another example, the control component 108 and the application server component 112 are the same component. The application server component 112 in one example comprises an instance of the recordable data storage medium 114.

The communication devices 102, 104, and 106 in one example access the application server component 112 to obtain a list of one or more open communication sessions. For example, users 118 and 120 employ the communication devices 104 and 106 to connect to the application server component 112. The users 118 in one example may want to discuss a topic of an open communication session of the one or more open communication sessions. The communication device 104 sends a request to join the open communication session.

Figure 2:
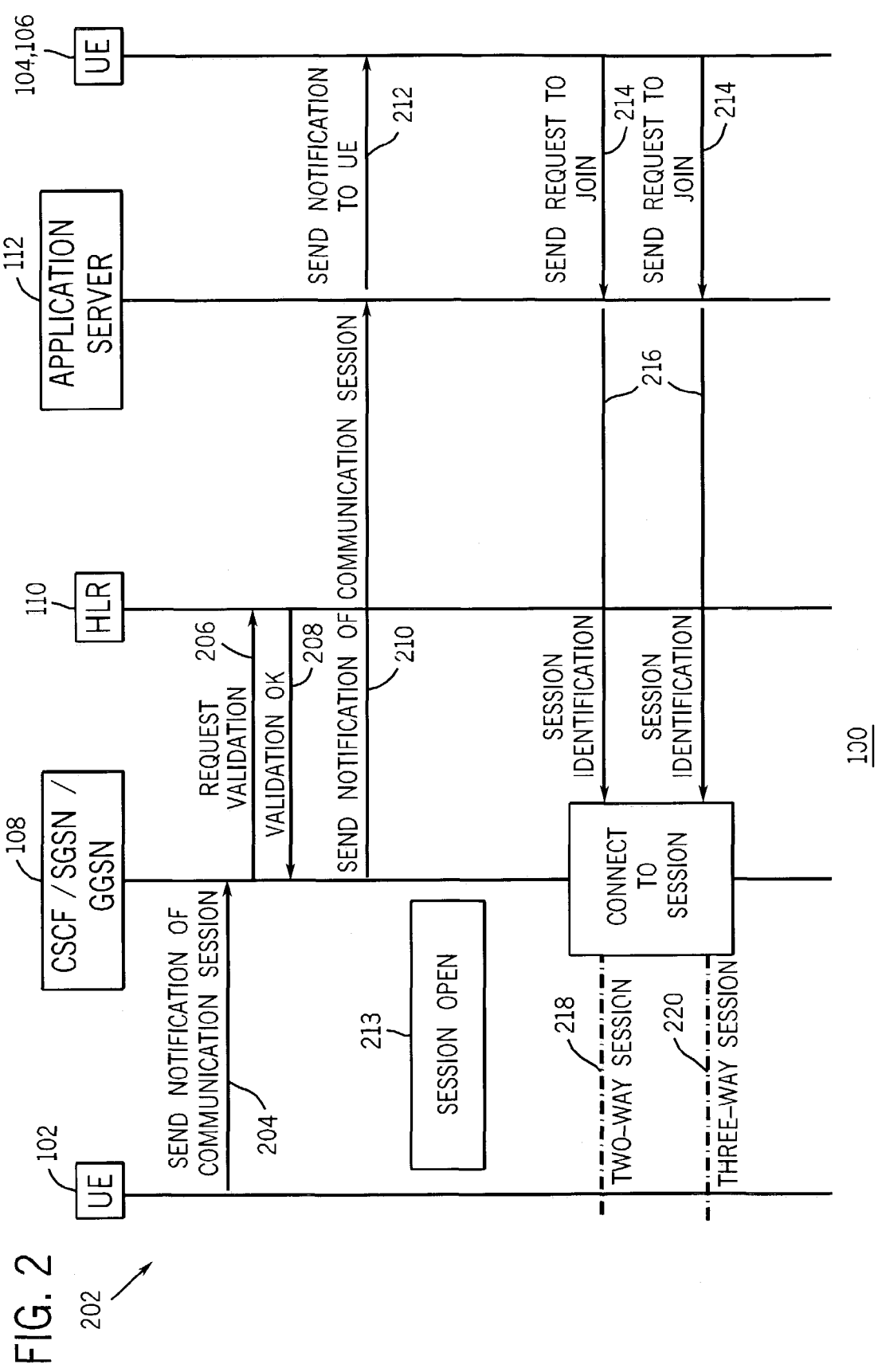
FIG. 2 is a representation of an exemplary implementation of a message flow illustrating an employment of notifications and requests of an open communication session by the application server component of FIG. 1.

Referring to FIGS. 1 and 2, an illustrative description of exemplary operation of the apparatus 100 is presented, for explanatory purposes. Message flow 202 represents an exemplary employment of notifications and requests of an open communication session by the application server component 112. For example, the communication device 102 sends a notification of an open communication session to the application server component 112. The application server component 112 sends the notification to the communication device 104. The communication device 104 sends a request to join the open communication session to the application server component 112. The application server component 112 connects the communication device 104 to the open communication session.

The user 116 employs the communication device 102 to send one or more notifications of an open communication session. The communication device 102 sends the one or more notifications 204 of the open communication session to the control component 108. "SEND NOTIFICATION OF COMMUNICATION SESSION" in one example serves to represent the one or more notifications 204. Upon receipt of the one or more notifications 204, the control component 108 in one example determines if the communication device 102 is able to participate in an open communication session service. For example, the control component 108 sends a request 206 for validation to the register component 110. "REQUEST VALIDATION" in one example serves to represent the request 206 for validation. Upon the request 206, the register component 110 sends a validation message 208 to the control component 108. "VALIDATION OK" in one example serves to represent the validation message 208.

Upon receipt of the validation message 208, the control component 108 sends one or more notifications 210 of the open communication session to the application server component 112. "SEND NOTIFICATION OF COMMUNICATION SESSION" in one example serves to represent the one or more notifications 210. Upon receipt of the one or more notifications 210, the application server component 112 sends one or more notifications 212 of the open communication session to the communication devices 104 and 106. "SEND NOTIFICATION TO UE" in one example serves to represent the one or more notifications 212. Upon receipt of the one or more notifications 212, the application server component 112 initiates the open communication session 213. "SESSION OPEN" in one example serves to represent the open communication session 213.

The communication device 102 in one example connects to the open communication session 213 at a time indicated by the notification 204. The communication devices 104 and 106 send one or more requests 214 to join the open communication session 213. "SEND REQUEST TO JOIN" in one example serves to represent the one or more requests 214. Upon receipt of the one or more requests 214, where the one or more requests 214 comprise a session identification 216 of the open communication session 213, the application server component 112 sends the session identification 216 to the control component 108. "SESSION IDENTIFICATION" in one example serves to represent the session identification 216 of the open communication session 213. Upon receipt of the session identification 216, the control component 108 creates one or more connections 218 and 220 between the communication devices 102, 104, and 106. "TWO WAY SESSION" in one example serves to represent the connection 218. "THREE WAY SESSION" in one example serves to represent the connection 220. The users 116, 118, and 120 in one example are able to discuss a topic of the open communication session 213.

Turning to FIGS. 1 and 3, message flow 302 represents an exemplary employment of notifications, requests, acceptances, and rejections of an open communication session by the application server component 112. The communication device 102 sends one or more notifications of an open communication session to the application server 112. The application server component 112 sends the notification to the communication device 104. The communication device 104 sends a request to join the open communication session to the application server component 112. The application server component 112 establishes a connection 304 between the communication devices 102 and 104. For example, the application server component 112 establishes the connection 304 as described in message flow 202. "SESSION ESTABLISHED" in one example serves to represent the connection 304 of the communication devices 102 and 104 to the open communication session.

Upon the connection 304 to the open communication session, the application server component 112 sends a notification 306 of the open communication session to the communication device 106. For example, the notification 306 comprises a list of communication devices on the open communication session. The list comprises the communication devices 102 and 104. "NOTIFICATION THAT SESSION ESTABLISHED" in one example serves to represent the notification 306. Upon receipt of the notification 306, the user 120 makes a determination to join the open communication session 308 based on the list. "SESSION OPEN" in one example serves to represent the open communication session 308.

The users 116 and 118 in one example may want to converse through a private communication session instead of the open communication session 308. For example, the user 116 may not wish to speak to the user 120 of the communication device 106. The user 116 employs the communication device 102 to send a notification 310 of the private communication session to the control component 108. "SEND NOTIFICATION OF PRIVATE COMMUNICATION SESSION" in one example serves to represent the notification 310. Upon receipt of the notification 310, the control component 108 sends a notification 312 of the private communication session to the application server component 112. "SEND NOTIFICATION OF PRIVATE COMMUNICATION SESSION" in one example serves to represent the notification 312.

Upon receipt of the notification 312, the application server component 112 sends a notification 314 of the private communication session to the communication device 106. "CHANGE TO PRIVATE COMMUNICATION SESSION" in one example serves to represent the notification 314. Upon receipt of the notification 314, the communication device 106 in one example sends a request 316 to join the private communication session. "CALL JOIN ATTEMPT" in one example serves to represent the request 316. Upon receipt of the request 316, the application server component 112 can make a decision 318 as to whether or not the communication device 106 can join the private communication session. "DECISION" in one example serves to represent the decision 318. In one example, the decision 318 comprises an acceptance of the request 316 to join the private communication session. In another example, the decision 318 comprises a rejection of the request 316 to join the private communication session.

The apparatus 100 in one example employs one or more computer-readable signal-bearing media. Examples of a computer-readable signal-bearing medium for the apparatus 100 comprise the recordable data storage medium 114 of the communication devices 102, 104, and 106, the register component 110, and the application server component 112. For example, the computer-readable signal-bearing medium for the apparatus 100 comprises one or more of a magnetic, electrical, optical, biological, and atomic data storage medium. In one example, the computer-readable signal-bearing medium comprises a modulated carrier signal transmitted over a network comprising or coupled with the apparatus 100, for instance, one or more of a telephone network, a local area network ("LAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   an application server component that receives one or more notifications of at least one open communication session from one or more first communication devices, wherein the one or more notifications are not limited to telephone numbers, email, a text message, an audio message, a video message, and an interactive multimedia session; and
   wherein the application server component sends at least one of the one or more notifications of the at least one open communication session to one or more second communication devices; and
   wherein upon a request by a communication device of the one or more second communication devices to join an open communication session of the at least one open communication session, the application server component initiates a connection of the communication device to the open communication session; and wherein at least one user of the one or more second communication devices employs one or more topics of the at least one open communication session, a list of the one or more first communication devices, and a time of the notification to make a determination to join the open communication session.

2. The apparatus of claim 1, wherein the at least one of the one or more notifications comprise information of the at least one open communication session; and wherein the application server component sends the at least one of the one or more notifications to the one or more second communication devices to output the information to the at least one user of the one or more second communication devices.

3. The apparatus of claim 2, wherein the information comprises the one or more topics of the at least one open communication session; and wherein the at least one user of the one or more second communication devices comprise a user of the communication device, and wherein the user employs the communication device to make a selection of a topic from the one or more topics, and wherein the topic corresponds to the open communication session; and wherein the communication device sends the request that comprises the topic to the application server component to join the open communication session; and wherein upon receipt of the request, the application server component initiates the connection of the communication device to the open communication session.

4. The apparatus of claim 2, wherein the information comprises the list of the one or more first communication devices; and wherein the at least one user of the one or more second communication devices comprise a user of the communication device, and wherein the user employs the list to make the determination to join the open communication session; and wherein upon the determination, the communication device sends the request to the application server component; and wherein upon receipt of the request, the application server component initiates the connection of the communication device to the open communication session.

5. The apparatus of claim 2, wherein the information comprises a limit to a number of the one or more second communication devices able to participate in the open communication session; and wherein once the number of the one or more second communication devices in the open communication session reaches the limit, the application server component rejects subsequent requests of the one or more second communication devices to join the open communication session.

6. The apparatus of claim 1, wherein the request comprises a session identification of the open communication session, and wherein the application server component sends the session identification to the one or more control components to initiate the connection of the communication device to the open communication session; and wherein the one or more control components employ the session identification to connect the communication device to the open communication session.

7. The apparatus of claim 1, wherein a third communication device accesses the application server component to obtain a list of the at least one open communication session; and wherein upon a request by the third communication device to join the open communication session, the application server component initiates a connection of the third communication device to the open communication session.

8. The apparatus of claim 1, wherein prior to receipt of the request from the communication device by the application server component, the one or more first communication devices send a notification of a private communication session to at least one of the one or more second communication devices; and wherein the open communication session becomes the private communication session.

9. The apparatus of claim 8, wherein the application server component receives one or more requests to join the private communication session from the at least one of the one or more second communication devices.

10. The apparatus of claim 9, wherein the application server component sends one or more rejections of the one or more requests to the at least one of the one or more second communication devices.

11. The apparatus of claim 9, wherein the application server component sends one or more acceptances of the one or more requests to the at least one of the one or more second communication devices.

12. The apparatus of claim 1, wherein the at least one open communication session comprise one or more voice chat rooms, and wherein the one or more notifications of the at least one open communication session comprises one or more notifications of one or more topics of the one or more voice chat rooms; and wherein the application server component sends at least one of the one or more notifications of at least one of the one or more voice chat rooms to the one or more second communication devices.

13. A method, comprising the steps of:

sending one or more notifications of at least one open communication session to one or more communication devices, wherein the one or more notifications are not limited to telephone numbers, email, a text message, an audio message, a video message, and an interactive multimedia session;

receiving a request to join an open communication session of the at least one open communication session from a communication device of the one or more communication devices;

initiating a connection of the communication device to the open communication session; and employing one or more of a topic of the at least one open communication session, a list of the one or more users of the one or more communication devices, and a time of the notification to make a determination to join the open communication session.

14. The method of claim 13, wherein the one or more notifications comprise information of the at least one open communication session, and wherein the information comprises the one or more of the topic, the list of one or more users of the one or more communication devices, and a list of the at least one open communication session, and wherein the one or more of the topic and the list correspond to the open communication session, and wherein the step of receiving the request to join the open communication session from the communication device further comprises the step of:

receiving the request to join the open communication session from the communication device.

15. The method of claim 13, wherein the one or more notifications comprise information of the at least one open communication session, and wherein the information comprises a limit to a number of the one or more communication devices able to participate in the open communication session, and wherein the step of receiving the request to join the open communication session from the communication device further comprises the steps of:
  receiving the request to join the open communication session from the communication device upon reaching the limit of the number of the one or more communication devices; and
  sending a rejection of the request to the communication device prior to initiation of the connection of the communication device to the open communication session.

16. The method of claim 13, wherein the request comprises a session identification of the open communication session, and wherein the step of initiating the connection of the communication device to the open communication session further comprises the steps of:
  receiving the session identification from the communication device; and
  sending the session identification to one or more control components to connect the communication device to the open communication session.

17. The method of claim 13, wherein the step of initiating the connection of the communication device to the open communication session further comprises the steps of:
  enabling access to a list of the at least one open communication session to a second communication device;
  receiving a request to join the open communication session from the second communication device; and
  initiating the connection of the second communication device to the open communication session.

18. The method of claim 13, wherein the one or more communication devices comprise one or more first communication devices, the method further comprising the steps of:
  receiving a notification of a private communication session prior to receipt of the request to join the open communication from one or more second communication devices;
  sending the notification of the private communication session to at least one of the one or more first communication devices; and
  changing the open communication session to the private communication session.

19. An article, comprising:
  one or more computer-readable signal-bearing media;
  means in the one or more media for sending one or more notifications of at least one open communication session to one or more communication devices, wherein the one or more notifications are not limited to telephone numbers, email, a text message, an audio message, a video message, and an interactive multimedia session;
  means in the one or more media for receiving a request to join an open communication session of the at least one open communication session from a communication device of the one or more communication devices;
  means in the one or more media for initiating a connection of the communication device to the open communication session; and
  means in the one or more media for employing one or more of a topic of the at least one open communication session, a list of the one or more users of the one or more communication devices, and a time of the notification to make a determination to join the open communication session.

20. The article of claim 19, wherein the one or more notifications comprise information of the at least one open communication session, and wherein the information comprises the one or more of the topic, the list of one or more users of the one or more communication devices, and a list of the at least one open communication session, and wherein the one or more of the topic and the list correspond to the communication session, and wherein the means in the one or more media for receiving the request to join the open communication session from the communication device comprises:
  means in the one or more media for receiving the request to join the open communication session from the communication device.

* * * * *